United States Patent [19]
Vargo

[11] 3,739,444
[45] June 19, 1973

[54] METHOD OF MAKING A LABYRINTH SEAL

[76] Inventor: E. James Vargo, 345 Balmoral Drive, Richmond Heights, Ohio 44143

[22] Filed: Feb. 16, 1971

[21] Appl. No.: 115,498

[52] U.S. Cl. ........ 29/148.4 S, 29/434, 29/DIG. 34, 277/56
[51] Int. Cl. ...................... B23p 11/00, B23p 19/00
[58] Field of Search ...................... 29/148.4 S, 434, 29/DIG. 34; 277/56

[56] References Cited
UNITED STATES PATENTS
3,206,829  9/1965  Schaeffler et al............... 29/148.4 S

*Primary Examiner*—Thomas H. Eager
*Attorney*—Woodling, Krost, Granger & Rust

[57] ABSTRACT

The present disclosure involves an improvement in the method of forming a labyrinth seal which has an outer member comprising a hollow cylindrical housing containing a plurality of stacked annular first plates positioned apart by means of annular first spacers. An inner member is provided which comprises a plurality of stacked annular second plates which interleave with the first plates and are positioned apart by means of second annular spacers. The improvement comprises the provision of a hollow housing with a first cover affixed thereto and with the axial length of the housing being sufficient to permit the upper portion to be bent over to form a flange. An inner cylindrical support member is inserted into the hollow in the housing. The first and second plates and spacers are then stacked in the housing and the first plates interleave with the second plates of the inner member. The upper portion of the housing and the upper portion of the support member are then bent over to position the first and second plates and the first and second spacers in the housing.

8 Claims, 6 Drawing Figures

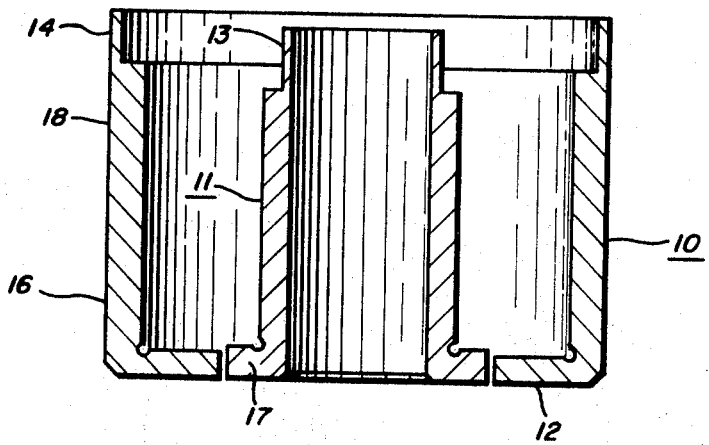
FIG. IA
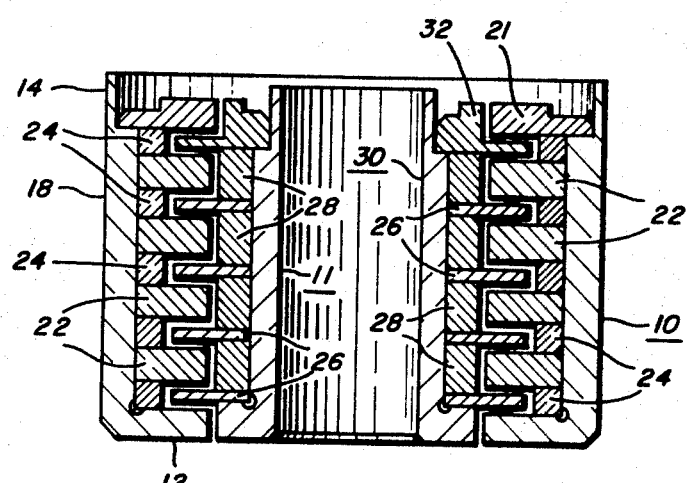
FIG. IB
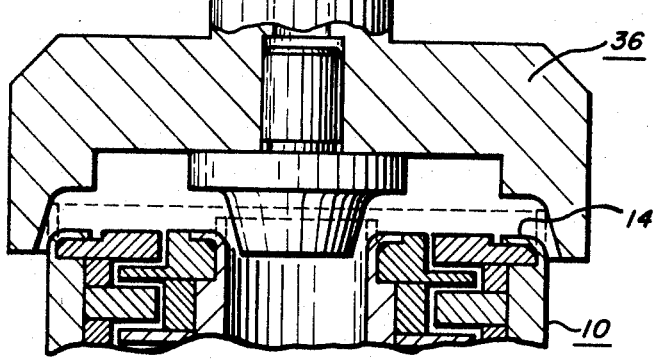
FIG. IC
INVENTOR.
E. JAMES VARGO 3,739,444

METHOD OF MAKING A LABYRINTH SEAL

BACKGROUND OF THE INVENTION

Field of the Invention

The present invention relates in general to an improved method of forming a labyrinth seal. More particularly, it concerns a unique package labyrinth seal which is easy to assemble and relatively easy to install and, accordingly, use.

BRIEF DESCRIPTION OF THE PRIOR ART

A labyrinth seal is basically intended to be a non-contacting or close clearance seal. This is, there is no rub or friction between the rotating an stationary members.

The labyrinth seal per se is not new to the art. It effects throttling or restriction of flow rather than absolute zero flow or leakage. The simplest labyrinth is merely very close clearance between the outside of the shaft and the surface of the hole in the stationary housing through which the shaft passes.

The next refinement of the labyrinth seal is to use fins either on the shaft or the housing in order to introduce a series of larger volumes and restrictions. In this case should an inadvertent rub take place between the parts, the fins would wear without any further serious damage.

Another refinement of the labyrinth is to have a series of fins alternating on the rotating shaft and on the stationary housing. This has the obvious effect of lengthening the restriction passage therefore providing a more efficient seal. However, it does introduce manufacturing and assembly complications.

The basic objective sought in a seal is to prevent flow (or contamination of one environment to the adjacent environment). This could be as simple as keeping dirt, dust water, road conditions, etc., from getting into a grease packed bearing on the front wheel of an automobile to the hot gas sealing needed in a gas turbine (jet) engine. Depending on economic considerations, desired performance, life, drastic environmental conditions, and other conditions too, the sought for and acceptable sealing can realistically vary from zero to even gallons of fluid per minute. Obviously non-contacting seals by virtue of their clearance will permit some degree of flow (leakage).

From the foregoing description of the prior art it can be seen that labyrinth seals of various types are known in the art. However, it should be pointed out here, that labyrinth seals are often expensive to fabricate and difficult to assemble primarily because they are part of the shaft and of the housing of the end device. Accordingly, labyrinth seals are often not used in many situations where the inherent attributes of such a seal are needed.

The instant invention provides a means of overcoming some of the above set forth difficulties which are experienced when one tries to utilize labyrinth seals found in the prior art by providing a means of inexpensively fabricating a labyrinth type seal.

SUMMARY OF THE INVENTION

The present invention is accomplished by providing a unique method of fabricating a labyrinth seal.

Very briefly, a labyrinth seal is formed which seal has an outer member comprising a hollow cylindrical housing forming a wall containing a plurality of annular stacked first plates positioned apart by means of annular first spacers which are fixedly positioned between first and second cover members; and an inner member comprising a plurality of stacked annular second plates interleaved with said first plates which are positioned apart by means of second annular spacers, with annular first and second end caps axially positioning said second plates and spacers therebetween.

One embodiment of such a labyrinth seal is formed by first providing a hollow, generally cylindrically shaped housing or outer member having a flange extending inwardly from the base or one end of the housing, with the altitude or axial length of the cylindrical housing being sufficient to permit a small part of the upper portion thereof to be bent over to form an upper flange which holds the second cover member in place when the first plates and first spacers are stacked in the housing and a cylindrical inner member positioned within the cavity of the housing with the inner member having a flange which extends outwardly from its base and its altitude is such that a small part thereof can be bent over to form a small flange which holds the second cap in place to fixedly position the second plates and spacers between the lower flange and the second cap; stacking the first plates and spacers in the housing to the desired height so that their diameter (either outside or inside) is essentially parallel to the surface of the lower flange and the first plates interleave with the second plates of the inner member, with the second plates and spacers being stacked concurrently with the stacking of the first plates and first spacers; and then bending over the upper portions of the housing and inner member to fixedly position the plates and spacers between the flange of the housing and the second cover and the flange of the inner member and the second cap, respectively, whereby a labyrinth seal is formed.

The plates and spacers have an outside and an inside diameter. In addition, the cover members and end caps also have outside and inside diameters. The outside diameter of the first plates and spacers is such that they essentially fit adjacent the inside diameter of the outer housing member. Also, the inside diameter of the first spacers is greater than that of the first plate member while the inside diameter of the second plate members and spacers are essentially equal but the outside diameter of the second plate members is greater than the outside diameter of the second spacers.

From the foregoing description of the invention it will be apparent to those skilled in the art that a simple and economical method of fabricating a labyrinth seal has been provided.

Accordingly, it is the principal object of the instant invention to provide a method of making a labyrinth seal which not only functions well as a seal per se, but is also relatively inexpensive to fabricate and quite simple to assemble and install.

Other objects and the means of accomplishing them will be apparent to those skilled in the art from the following description and drawings wherein like parts are referred to and indicated by like reference numerals.

BRIEF DESCRIPTION OF THE DRAWINGS

FIGS. 1A, 1B, 1C and 1D are sequential illustrations showing in cross section the labyrinth seal of the invention as it is fabricated in a step-wise manner from step A through D;

DESCRIPTION OF THE PREFERRED EMBODIMENT OF THE INVENTION

Figure 1D:
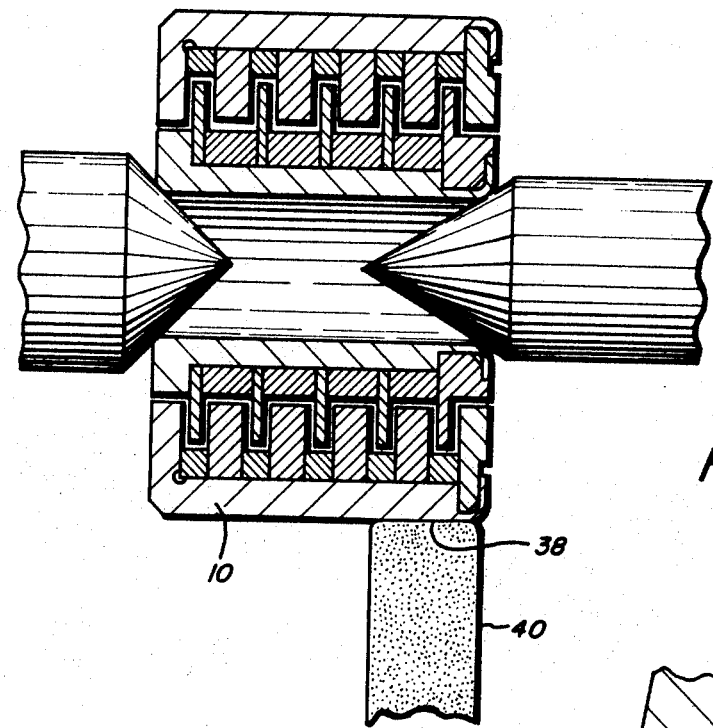

The preferred method of producing the labyrinth seal of the invention is illustrated sequentially in FIG. 1.

Step A shows an outer member or hollow cylindrical housing 10 which has a lower circumferential flange 12. It is noted in this figure that the upper portion 14 of the wall 18 of cylindrical housing 10 is thinner than the lower portion 16 of the wall 18. If desired, a notch can be provided in the wall 18 to facilitate the bending over of the upper portion 14 of the wall 18 of cylindrical housing 10 to form the labyrinth seal of the invention. An inner cylindrical support member 11 is also shown, which has an upper portion 13 capable of being bent over into a flange and a flange 17 on the other end. It is positioned inside of the housing 10.

Step B shows the housing 10 of Step A containing a plurality of annular first plates 22 which are spaced apart by annular first spacers 24. The first plates 22 interleave with second plates 26 which are, in turn, spaced apart by annular second spacers 28. An inner member 30 is shown composed of alternating second plates 26 and second spacers 28 positioned in housing 10 on inner member. Cover 21 and cap 32 fixedly position the plates and spacers within the outer and inner members, respectively.

Step C shows the folding or bending over by mechanism 36 of the upper portion 14 of wall 18 so as to contain the internal components of the labyrinth seal between flange 12 and cover 21. The dotted line (FIG. 1C) shows the old position of the upper portion of wall 18 of housing 10. The mechanism 36 also is capable of bending over portion 13 as shown. Mechanism 36 is capable of moving axially and is also rotatable to accomplish its function.

Step D shows the outer surface 38 of the labyrinth seal being ground to the desired finish by means of grinding apparatus 40. While it is not shown herein, it is obvious that both ends of the labyrinth can be ground or finished to the desired surface either separately or concurrently.

In actual practice, the labyrinth seal of the invention can be formed by taking a housing 10 (as shown in Step A) and inserting the inner member 13 therein. The annular plates and spacers are then inserted in the desired sequence. This procedure is then followed until a stack of alternating spacers and plates (as shown in Step B has been achieved) and first end cap 32 and cover 21 have been applied. Flanges 13 and 14 are then bent over as shown in Step C. The outer surfaces of the labyrinth seal are then ground to the desired finish and dimensions as shown in Step D. Subsequently, the internal surface of the labyrinth seal may be ground to the desired finish and dimension.

While not shown in FIG. 1 or recited in the above dequential procedure, it should be noted here that a viscous seal forming medium (such as wax not physically shown) can be applied at any practical point in the assembly process. This viscous seal medium is normally solid up to a temperature of approximately 120°F. It, however, is usually preferably applied after the flanges 13 and 14 are formed into place or after the inner and outer members are assembled.

Figure 2:
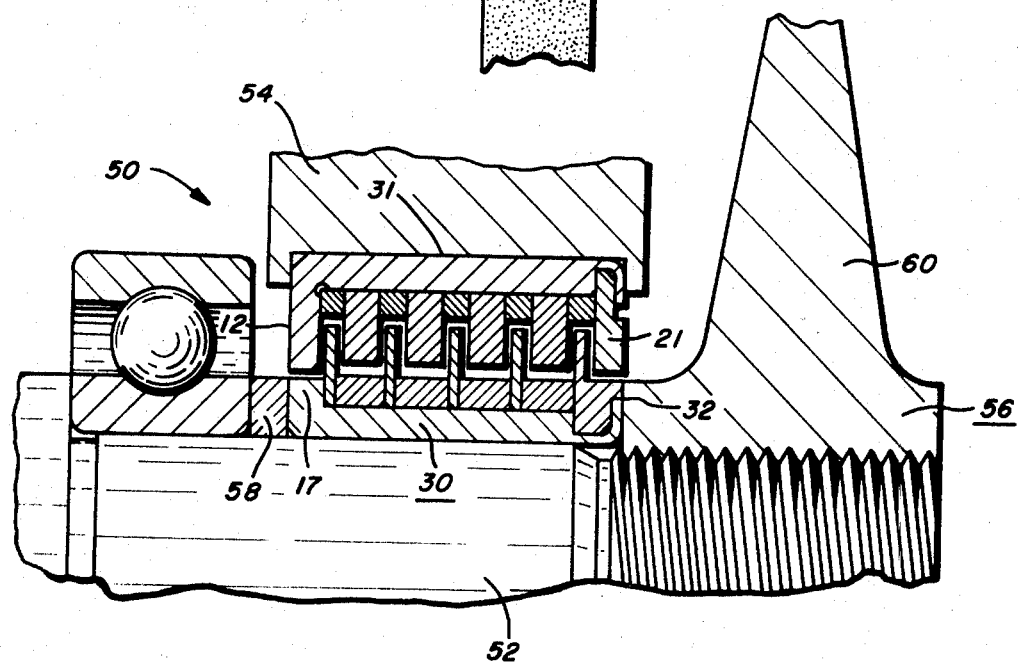
FIG. 2 is an elevational view in cross-section of part of a shaft and housing assembly embodying the labyrinth seal of the invention.

FIG. 2 illustrates the labyrinth seal 50 of the invention being employed to form a seal between a shaft 52 and a housing 54 of an assembly 56 (which is not completely shown). The seal of the invention 50 comprises an inner member 30 and an outer member 31. The outer member 31 is made up of the housing 10 containing first plates 22 which are spaced apart by first spacers 24 with the plates and spacers being held in place by end flange 12 and cover 21. The first plates 22 interleave with second plates 26 in the inner member 30. These plates, in turn, are spaced apart by second spacers 28. The inner member 30 is shown composed of alternating second plates 26 and second spacers 28 which are axially positioned between end cap 32 and flange 17. The inner member 30 of seal 50 is fixedly positioned on the shaft 52 by means of ring 58 and impeller 60. The outer member 31 of seal 50 is held in the housing 54 as shown in FIG. 2. A seal is then maintained between inner member 30 and outer member 31 by means of the labyrinth path produced.

Figure 3:
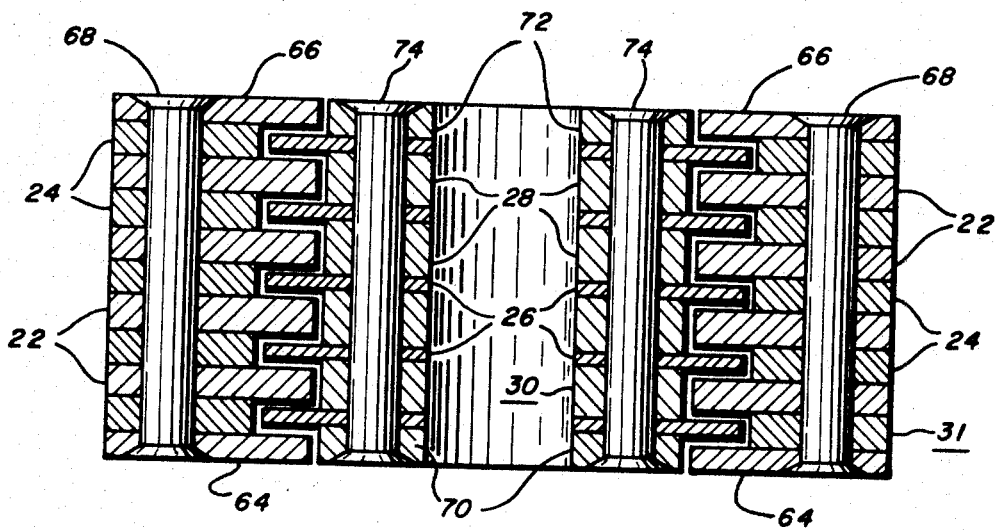
FIG. 3 is an elevational view in cross-section of another embodiment of the invention wherein the plates and spacers in the outer and inner members are held in place by means of rivets.

In FIG. 3 another embodiment of the labyrinth seal of the invention is shown. It comprises an inner member 30 and an outer member 31. The outer member 31 comprises a housing including first plates 22 having an outside diameter and which are spaced apart by first spacers 24 having an outside diameter and each having an inside diameter larger than the inside diameter of plates 22 with the spacers and plates fixedly held in place between first and second cover members 64 and 66, respectively, by means of an outer rivet 68. The first plates 22 interleave with second plates 26 in the inner member 30. These plates, in turn, are spaced apart by second spacers 28. The inner member 30 is shown composed of alternating second plates 26 and second spacers 28 which are axially positioned between first and second end caps 70 and 72, respectively, by means of inner rivet 74.

While in the foregoing embodiments the seal of the invention has been illustrated in a given manner, it will be readily apparent to those skilled in the art that many modifications can be made without departing from the spirit and scope of the instant invention.

For example, in the seal 50 illustrated in FIG. 2, the housing 10; the end cap 32; and the second plates and spacers are fabricated from stainless steel while the first plates and spacers are fashioned from formed carbon or graphite. These components can be produced from other materials such as bronze, aluminum, plastic bimetals, etc. without deviating from the scope of the invention. Likewise, the seal itself can be made longer or shorter, larger or smaller in diameter, as desired. Also, the viscous medium can be any suitable substance such as a heavy grease or wax. The members 22 and 26 may be of various configurations other than generally parallel to each other as shown, for example they may have generally axially extending interfitting portions which would not be possible to assemble without proceeding in the method set forth in this invention. All of these variations do not affect the spirit of the instant invention.

In addition, a labyrinth seal can be formed by combining the various means shown in FIGS. 2 and 3 for containing the plates and the spacers. For example, the outer member of the seal can be fashioned as shown in FIG. 2 while the inner member is constructed as shown in FIG. 3. Also, it should be noted that the end cap or caps as the case may be, can have a cross section as illustrated at 32 in FIG. 2 or as shown at 72 in FIG. 3.

Also, it is within the scope of the invention to hold an end cap or cover member in place by means of machine screws or a bonding material such as a metallic weld or an epoxy cement.

Labyrinth seals of the type shown in FIGS. 2 and 3 can be fabricated by employing the following procedure. The individual elements of the inner group and the outer group would be assembled and their proper position (or clearance) relative to one another established by a manufacturing fixture. Then the internal space or spaces would be filled with liquid wax or plastic and allowed to cool and set. This would make the package a relatively solid mass at this time so that it could readily and accurately be machined, ground, etc., with relative ease on present high production machine tools. This procedure would serve two important purposes. One, it would keep all the various components firmly in position in relation to each other while the precision machining is performed. And, two, it would elimininate any contamination by machining debris, such as chips or grinding wheel wear, or the labyrinth seal assembly. The plastic could then be melted out or retained, if desired.

While in the foregoing illustrations of the practice of the invention the labyrinth of the seal has been formed by plates and spacers which extend at right angles from the major axis of the containing inner and outer member, as the case may be, it is within the scope of the instant invention to form the labyrinth by other means, such as by interlocking or interleaving members which are positioned at some angle other than 90° with respect to the major axis of the containing member.

The seal of the invention finds application in the gas turbine engine market. It can be used as a main shaft seal, sealing air and/or gas from the bearing systems. It is also readily applicable to the inter-stage area where an abradable seal is being used. This latter seal is expensive and rather inefficient when compared to the labyrinth seal of the type described herein.

Summarizing, this invention provides an independant package labyrinth seal, comprised of the simplest external surface shape readily adaptable for use in wide varieties of devices requiring sealing capability.

Although always presenting essentially the same simple external package the nature, shape and complexity of the internal members can be varied according to the invention in order to provide acceptable performance at minimum cost.

The sum and total of the individual parts and the whole of the invention are such that they can be produced feasibly and economically in large quantities again independant of the end using device.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

What is claimed is:

1. In the method of forming a labyrinth seal having an outer member comprising a hollow cylindrical housing containing a plurality of stacked annular first plates positioned apart by means of annular first spacers; an inner member comprising a plurality of stacked annular second plates which interleave with said first plates which are positioned apart by means of second annular spacers; the improvement which comprises:
    a. providing a hollow, generally cylindrically shaped housing having a first cover affixed thereto and extending inwardly from one end of said housing with the axial length of said cylindrical housing being sufficient to permit the upper portion thereof to be bent over to form a flange;
    b. inserting an inner cylindrical support member having an altitude essentially equal to said housing and a first end cap extending outwardly from the lower end portion thereof in the hollow in said housing;
    c. stacking said first and second plates and spacers, respectively, in said housing to the desired height so that their diameter is essentially parallel to that of said first cover and said first plates interleave with the second plates of said inner member;
    d. bending over the upper portion of said housing and inner support member to axially position said first and second plates and said first and second spacers, whereby a labyrinth seal is formed.

2. The method of claim 1, wherein a seal forming medium which is normally solid at room temperature medium is inserted between said outer member and said inner member.

3. The method of claim 1, wherein at least a portion of the external surface of said housing is subjected to a machining operation to produce the proper finish and tolerances.

4. The method of claim 2, wherein at least a portion of the external surface of said housing is subjected to a machining operation to produce the proper finish and tolerances.

5. The method of claim 3, wherein a seal forming medium which is normally solid at room temperature medium is inserted between said outer member and said inner member after said machining operation.

6. The method of claim 1, wherein:
    a. said first plates and first spacers are fabricated from a carbon base material, and
    b. said second plates and spacers, said cover, said cap, said inner support member, and said housing, are fabricated from stainless steel.

7. The method of claim 1, wherein the major portion of the outer wall of said cylindrically shaped housing is of a greater thickness than that portion of said housing which is adapted to be bent over to form a flange.

8. The method of claim 1, wherein said first plates and first spacers are held in place by means of a cover member which is fixedly positioned by said flange.

* * * * *